US008512615B1

(12) United States Patent
Amdur et al.

(10) Patent No.: US 8,512,615 B1
(45) Date of Patent: Aug. 20, 2013

(54) METHODS FOR MAKING CUSTOMIZED GLOVES AND FORMERS

(75) Inventors: Samuel T. H. Amdur, Libertyville, IL (US); Edward Danavi, Palatine, IL (US); Alan E. Weiss, Highland Park, IL (US)

(73) Assignee: Medine Industries, Inc., Mundelein, IL (US)

( * ) Notice: Subject to any disclaimer, the term of this patent is extended or adjusted under 35 U.S.C. 154(b) by 1061 days.

(21) Appl. No.: 12/080,521

(22) Filed: Apr. 3, 2008

Related U.S. Application Data

(60) Provisional application No. 60/921,698, filed on Apr. 4, 2007.

(51) Int. Cl.
*B29C 33/40* (2006.01)

(52) U.S. Cl.
USPC .......................................................... 264/222

(58) Field of Classification Search
USPC .......................................................... 264/222
See application file for complete search history.

(56) References Cited

U.S. PATENT DOCUMENTS

| | | | |
|---|---|---|---|
| 4,115,873 A * | 9/1978 | Stansbury ........................ 2/163 |
| 4,538,353 A | 9/1985 | Gardner ............................. 33/3 |
| 4,604,807 A | 8/1986 | Bock et al. ......................... 33/3 |
| 4,897,924 A | 2/1990 | Tepley ............................... 33/2 |
| 4,921,672 A | 5/1990 | Bock .............................. 264/161 |
| D316,679 S | 5/1991 | Tepley ........................... D10/46 |
| D316,680 S | 5/1991 | Tepley ........................... D10/46 |
| 5,014,361 A * | 5/1991 | Gray ................................. 2/167 |
| 5,228,164 A | 7/1993 | Graf et al. ................... 12/133 R |
| 5,539,677 A | 7/1996 | Smith ........................... 364/560 |
| 5,671,055 A | 9/1997 | Whittlesey et al. ........... 356/376 |
| 6,327,787 B1 | 12/2001 | Bonzagni et al. ............... 33/512 |
| 6,383,148 B1 | 5/2002 | Pusch et al. ................... 600/587 |
| 6,463,351 B1 | 10/2002 | Clynch ......................... 700/163 |
| 6,614,538 B1 | 9/2003 | Basler et al. .................. 356/602 |
| 6,708,346 B2 | 3/2004 | Terris et al. ................... 2/161.2 |
| 6,808,501 B2 | 10/2004 | Stess et al. ....................... 602/6 |
| 6,879,945 B1 | 4/2005 | Cook .............................. 703/2 |
| 2001/0027348 A1 * | 10/2001 | Ferrone ..................... 623/23.74 |
| 2002/0174478 A1 | 11/2002 | Litke .............................. 2/161.4 |

* cited by examiner

*Primary Examiner* — Christina Johnson
*Assistant Examiner* — Patrick Butler
(74) *Attorney, Agent, or Firm* — Nixon Peabody LLP

(57) ABSTRACT

A method of making custom glove formers for making custom-fit disposable gloves using a three dimensional camera or laser for taking the dimensions of a user's hand and making a mold therefrom for use in making the custom glove former. Alternatively, the method includes using an impression material for taking an impression of a user's hand to make a mold for use in making the custom glove former. In further embodiments, the method includes using a combination of a three dimensional camera or laser and impression material to make a mold for use in making the custom glove former. The custom glove formers are then used for making the custom-fit disposable gloves.

11 Claims, 7 Drawing Sheets

METHODS FOR MAKING CUSTOMIZED GLOVES AND FORMERS

CROSS-REFERENCE TO RELATED APPLICATION

This application claims the benefit of priority of U.S. Provisional Application No. 60/921,698, filed Apr. 4, 2007, which is hereby incorporated by reference in its entirety.

FIELD OF THE INVENTION

The present invention relates generally to formers for producing disposable gloves. More particularly, the present invention relates to customized glove formers that provide gloves that are custom-fit to a user's hand.

BACKGROUND OF THE INVENTION

Disposable gloves are widely used as a protective measure and have become mandatory in many industries and nearly all medical settings. They protect the person wearing the disposable gloves from various objects or materials handled or touched by that person. Most disposable gloves are commercially available ("off-the-shelf") in standard glove sizes, ranging from 5.5 to 9.0, including half (½) sizes. Typically, the disposable gloves are manufactured using different-sized formers that correspond to the various commercially-available standard glove sizes.

Some disposable glove users, particularly surgeons, may find that commercially-available disposable surgical gloves do not fit them well. Ill-fitting gloves may cause users to develop hand fatigue and other problems associated with gloves that do not fit properly. Additionally, some disposable glove users may have physical conditions, such as missing fingers, dwarfism, etc., that preclude them from wearing commercially-available standard-sized disposable gloves.

Therefore, there exists a need for customized disposable gloves that are a replica of a user's hand and, thus, provide a better fit to a user's hand. Such gloves will reduce the occurrence of hand fatigue and other physical problems associated with ill-fitting disposable gloves. This will be beneficial to those users, such as surgeons, who may not be able to find a commercially-available glove "off-the-shelf" that fits the surgeon's hand. This will also be beneficial for surgeons who have physical problems that preclude them from using standard, commercially-available, off-the-shelf gloves. To that end, there exists a need for customized glove formers that provide customized disposable gloves.

SUMMARY OF THE INVENTION

According to one embodiment, a method for making a surgical glove that custom fits a user's hand includes the acts of taking a three-dimensional image of the user's hand, the three-dimensional image providing data on the dimensions of the user's hand, using the data to make a mold of the user's hand based on the data from the three-dimensional image, and using the mold of the user's hand to prepare a former for use in making the custom-fit surgical glove.

According to another embodiment, a method for making a surgical glove that is customized for a user's hand includes the acts of inserting the user's hand into an impression material, allowing the impression material to harden around the user's hand, removing the user's hand from the impression material after the impression material has hardened, using the hardened impression material to make a mold of the user's hand and using the mold of the user's hand to prepare a former for use in making the customized surgical glove.

According to a further embodiment, a method for making a surgical glove that custom fits a user's hand includes the acts of inserting a first portion of the user's hand into an impression material, allowing the impression material to harden around the first portion of the user's hand while the first portion of the user's hand is in the impression material, taking a three-dimensional image of a second portion of the user's hand, the three-dimensional image providing data on the dimensions of the second portion of the user's hand. The method further includes removing the first portion of the user's hand from the impression material after the impression material has hardened, scanning the imprint of the first portion of the user's hand in the impression material, using a combination of the scanned imprint of the first portion of the user's hand and the data from the three-dimensional image of the second portion of the user's hand to make a mold of the user's hand, and using the mold of the user's hand to prepare a former for use in making the custom-fit surgical glove.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
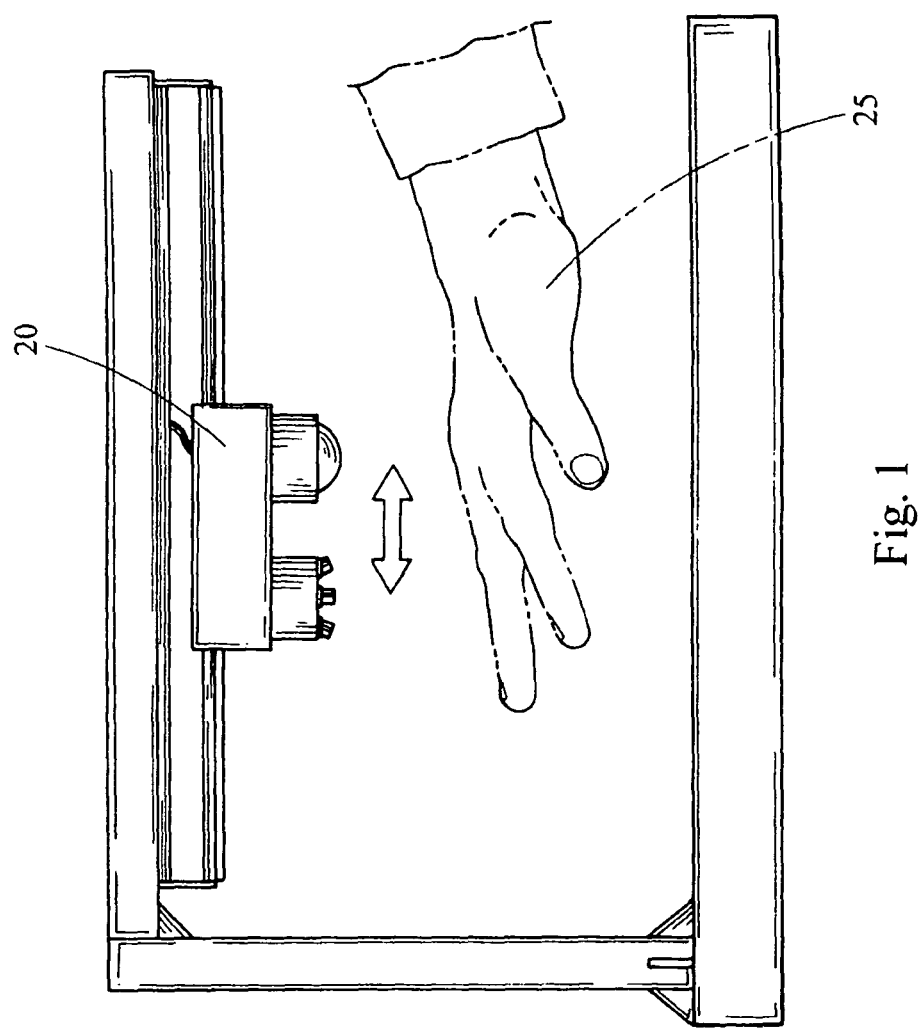
FIG. 1 illustrates a side view of a camera and/or laser for photographing and/or scanning a hand according to one embodiment.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention.

DESCRIPTION OF ILLUSTRATIVE EMBODIMENTS

Glove formers are used in the manufacture of latex or synthetic polymer products, such as disposable surgeons gloves. The glove formers are typically made of ceramic, glass, porcelain, composite steel or aluminum. The formers, usually of various sizes, are dipped, usually fingers first, into a liquid polymer bath where the polymer adheres to the former. The polymer may be natural latex, synthetic latex, nitrile, neoprene, vinyl or any other natural or synthetic material that could be formed into gloves. The polymer is coagulated, and the glove may undergo additional treatment. The disposable glove is released from the glove former usually by peeling the glove from the former. The disposable gloves may then be packaged and sterilized for shipping.

The size of the glove former dictates the size of the disposable glove. Typical commercially-available off-the-shelf disposable gloves range from 5½ to 9 in half (½) sizes. Thus, medical personnel must select a glove size from the standard glove sizes that best fits their hands. Individuals with hand deformities, however, do not fit well into these standard disposable glove sizes. For example, individuals with dwarfism or missing digits may find that the standard glove sizes cause their hands to become fatigued, cramped, sore, etc. Also, individuals who cannot find a standard-sized glove that fits them well may also suffer from ill-fitting gloves. This may cause their hands to become fatigued, cramped, sore, etc. In a hospital setting, especially an operating room, fatigued, cramped or sore hands may cause serious problems and risk the well-being of the patient on whom the surgeon is operating. Custom-fit disposable gloves may also be beneficial for certain types of medical procedures due to the precision that is needed at the surgical site. Moreover, for users who need a size between 5½ and 9, but who need the glove to vary by a ¼ size rather than a ½ size, the custom-fit gloves may be useful for such users as well.

A custom former is provided that produces a custom-fit disposable glove for persons who are not able to wear standard glove sizes or who desire to have a well-fit disposable glove. A custom-fit disposable glove that is a replica of the user's hand will provide a perfect fit and reduce hand fatigue and other problems associated with gloves that do not fit properly.

According to one embodiment, a mold for making a customized former may be made by taking a three-dimensional image of the user's hand to "map" the hand. The three-dimensional image provides data on the precise dimensions of the user's hand. The data may be used to make a master mold of the user's hand. In some embodiments, this data may be transmitted to a surgical glove former manufacturing facility to make the master mold. The master mold may then be used to create a ceramic former, or other type of former such as glass, porcelain, composite steel or aluminum, that is used to make custom-fit surgeons gloves designed to match the precise dimensions of the user's hand. Once the former is made, it can be dipped into a polymer bath to create a custom-fit disposable glove using either a batch dipping process or a continuous dipping process. Other methods used in the industry for making disposable gloves may also be used with the present invention.

The three-dimensional image may be created by using one or more devices 20 to take photographs and/or dimensions of the user's hand 25, as shown in FIG. 1. Each hand may be photographed in its normal position, i.e., in a natural, relaxed configuration. The device 20 may be a three-dimensional camera, a laser, a scanner or other device that can provide data on the dimensions of a user's hand 25. A software program may then translate the data into hand dimensions that may be used for making the master mold.

A three-dimensional camera may include any photography technology that is capable of taking a picture and translating the picture via software into data that may be used to make a master mold for the custom former. A laser may include a hand-held scanner that can be moved in different directions around a user's hand. Alternatively, the laser may be a fixed scanner. Similar to the camera mentioned above, information from the laser may be translated into data that may be used to make a master mold for the custom former.

Figure 2:
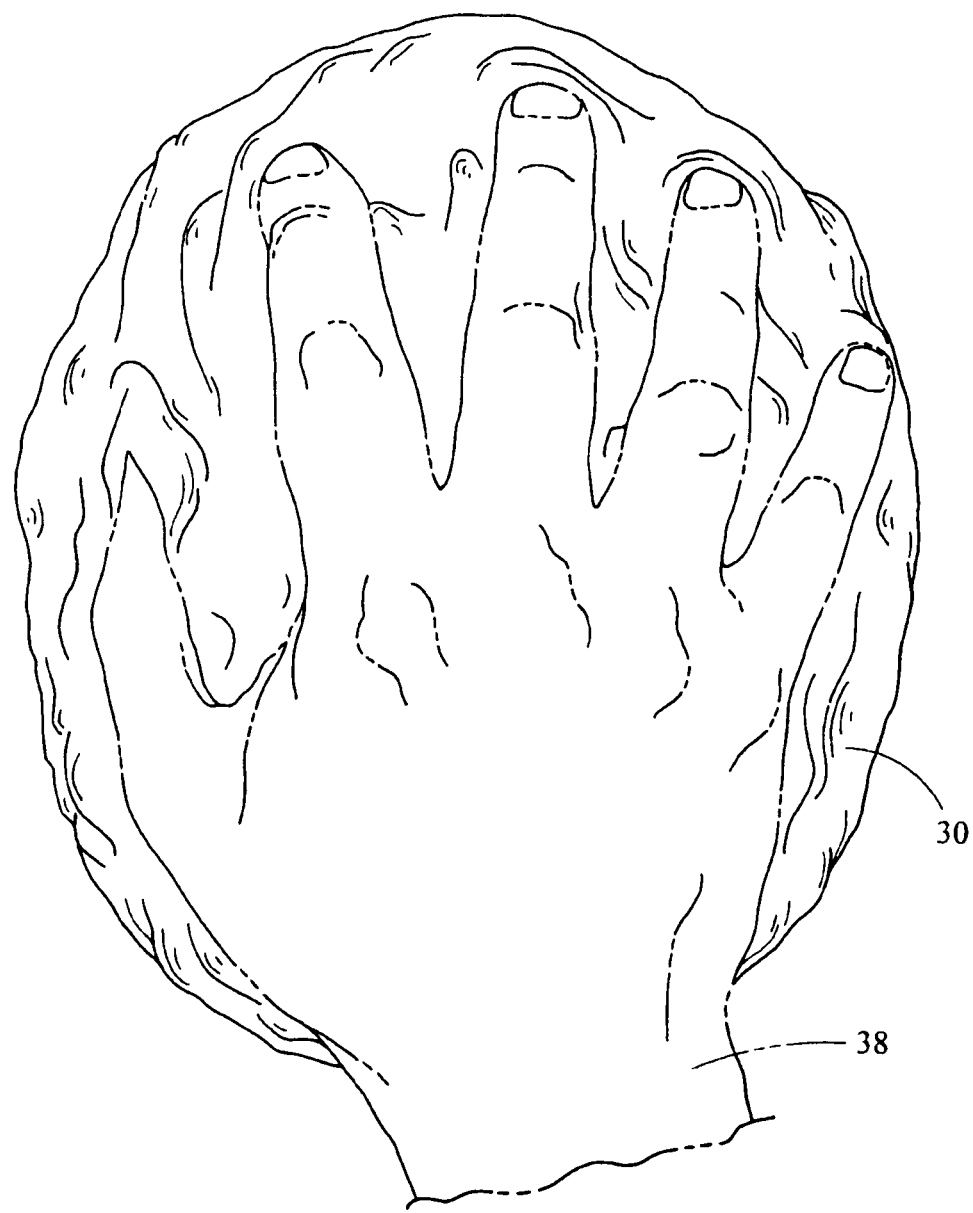
FIG. 2 illustrates a top view of a hand placed into an impression material according to another embodiment.
Figure 3:
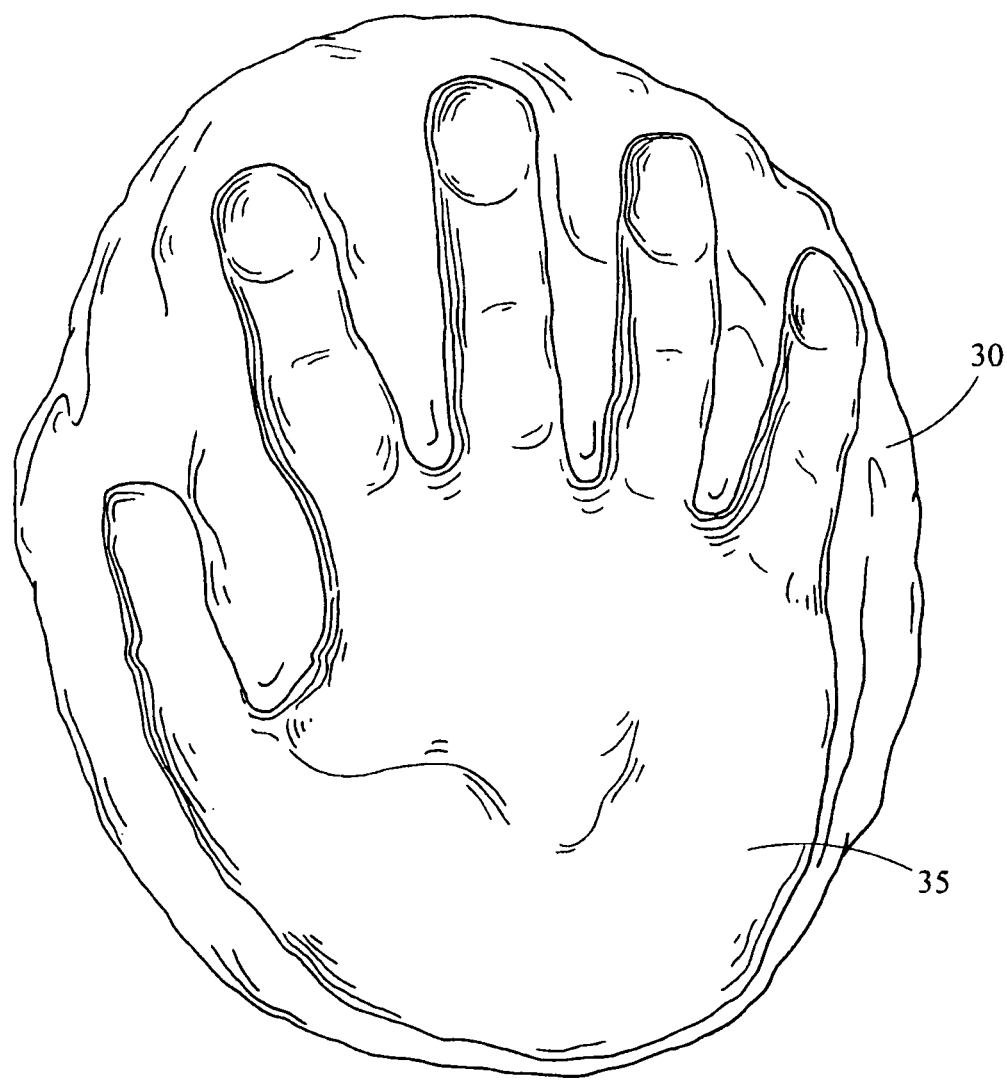
FIG. 3 illustrates a top view of the impression material having an imprint of the hand of FIG. 2.

According to another embodiment, a mold for making a customized former may be made using impression material 30 for making an imprint 35 of at least a portion of a user's hand 38, as shown in FIGS. 2 and 3. The user's hand 38 may be placed into the impression material 30 until the material forms an impression of the portion of the user's hand 38. When the portion of the hand 38 is removed from the impression material 30, the imprint 35 of the portion of the user's hand 38 remains in the impression material 30.

In other embodiments (not shown), a user's hand may be placed into a physical model, such as a two-piece, hinged container housing the impression material. The impression material may be poured into the two-piece, hinged container such that the impression material fills the top and bottom portions of the container. The user's hand may be inserted into the bottom portion of the container and then the container is closed so that the impression material forms around the user's hand. The container is kept closed and the impression material is allowed to harden around the user's hand. Once the impression material hardens, which may occur in a few minutes, i.e., about 2 to about 5 minutes, the container may be unhinged to remove the user's hand. The process may be repeated for the second hand of the user.

In some embodiments, the user's hand may be placed in the container and then the impression material may be injected into the container. In any embodiment, it is important that the user's hand remain in a natural, relaxed position, i.e., not flat or stiff, as this will provide a better image of the hand and will translate into a better-fitting custom glove.

The hardened impression material may then be used to make a master mold, or other physical model, of the user's hand. In some embodiments, the hardened impression material may be photographed or scanned to provide data which may be translated into hand dimensions by a software program. This information may then be transmitted to a disposable glove former manufacturing facility and may be used for making the master mold. The master mold may then be used to create a former that is used to make custom-fit surgeons gloves. Once the former is made, it can be dipped into a polymer bath to create a custom-fit disposable glove.

The impression material may be comprised of a resin epoxy system, plaster, Play-doh® or other types of materials that are adapted for taking impressions. As one example, the impression material commonly used for dental procedures may be used with embodiments of the present concepts. Other types of impression material that may be used include any material that may be formed into a shape and scanned or photographed. Ideally, the impression material is fast setting, i.e., five minutes or less, and flows easily around the user's hand.

Figure 4:
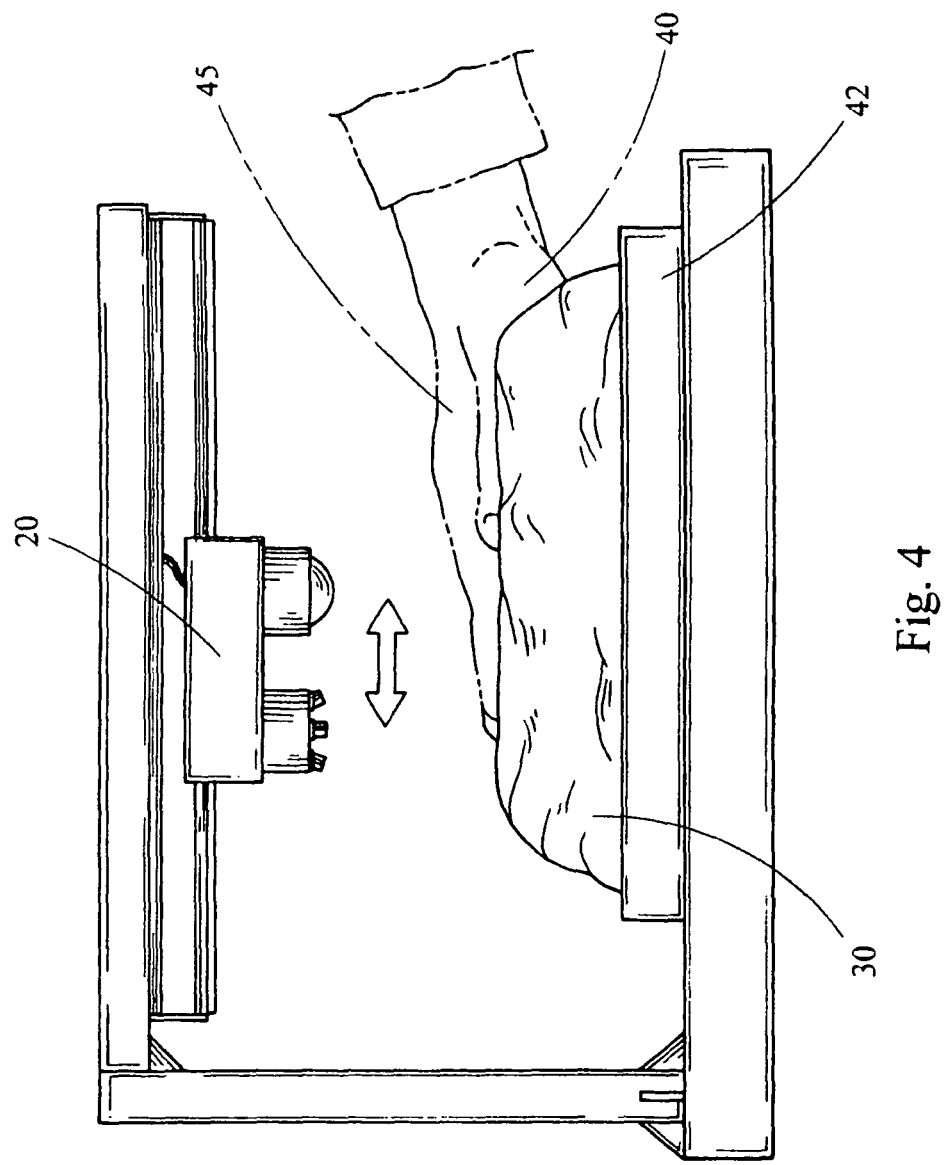
FIG. 4 illustrates a side view of a camera and/or laser for photographing and/or scanning the impression material and the hand according to another embodiment.

According to a further embodiment, a mold for making a customized former may be made using impression material for making an imprint of a first-portion of a user's hand and a camera/laser for photographing/scanning a second portion of the user's hand, as shown in FIG. 4. For example, in one type of physical model, the bottom part of a user's hand 40 may be placed into a tray 42 containing the impression material 30. As the impression material 30 is allowed to harden around the first portion (i.e., the bottom part) of the user's hand 40, a three-dimensional image of a second portion of the user's hand 45 (i.e., the top portion of the user's hand) is taken using a camera and/or laser 20. The three-dimensional image provides data on the dimensions of the second portion of the user's hand 45.

Figure 5:
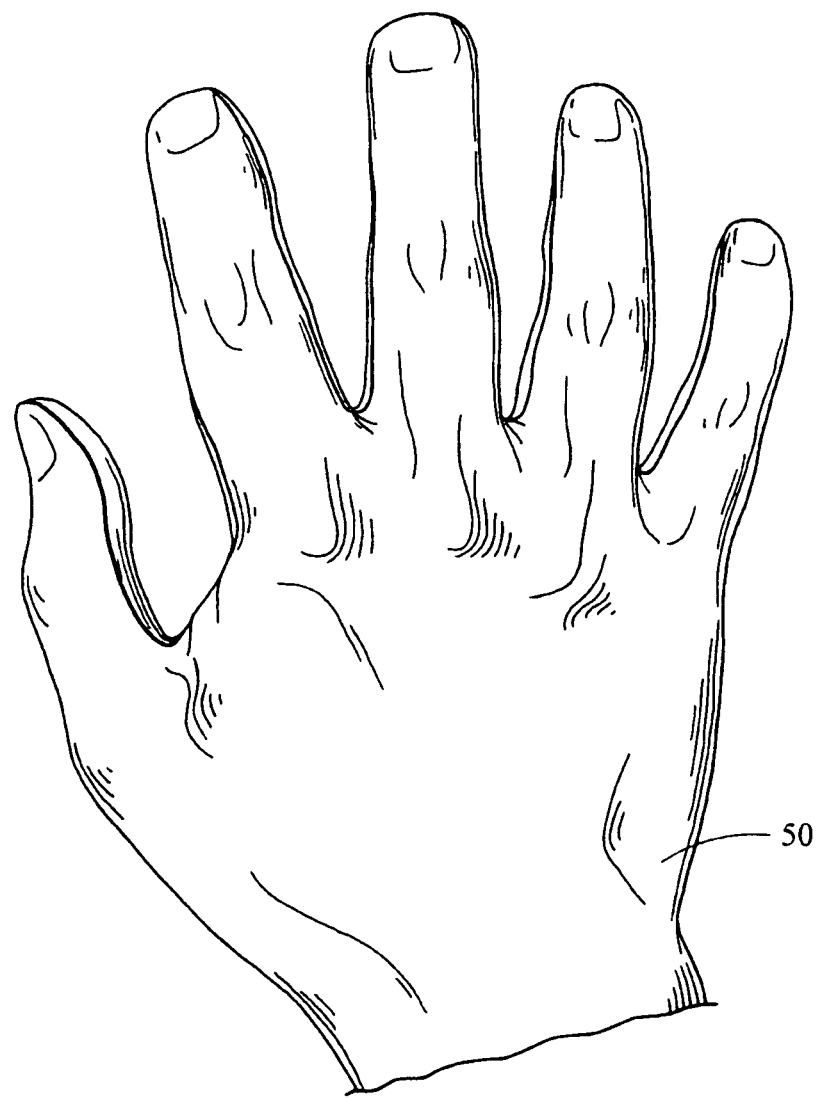
FIG. 5 illustrates a top view of a picture of a hand having top and bottom portions of the hand married together according to a further embodiment.

The first portion of the user's hand 40 may be removed from the impression material 30 in the tray 42 after the impression material 30 has hardened and the imprint of the first portion of the user's hand 40 may be scanned or photographed (see FIG. 3). Using a combination of the scanned imprint of the first portion of the user's hand 40 and the data from the three-dimensional image of the second portion of the user's hand 45, the top and bottom portions of the hand 50 are married, as shown in FIG. 5. This married version 50 of the user's hand may be used for creating the master mold. It is contemplated that different portions of the user's hand may be imprinted and/or photographed/scanned in addition to those described above. For example, the top portion of the user's hand may be placed into impression material while the bottom portion of the user's hand is photographed/scanned. Other combinations of imprinting and/or photographing/scanning different portions of a user's hand are possible with the present invention.

Figure 6:
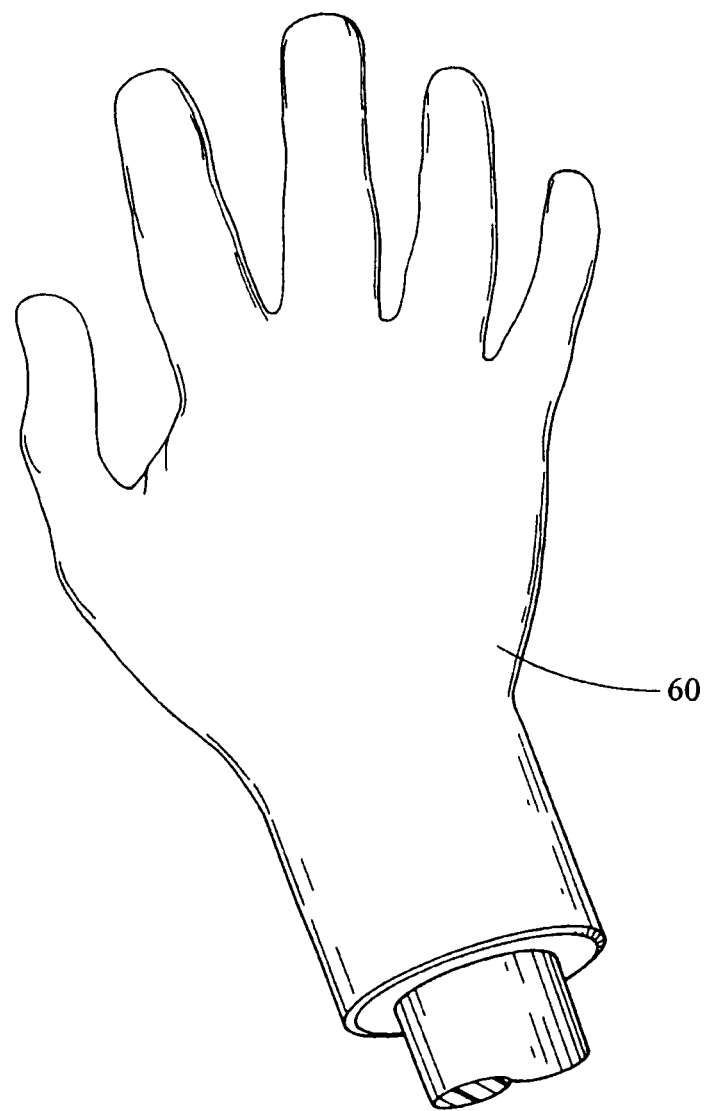
FIG. 6 illustrates a customized former made according to the embodiments described herein.
Figure 7:
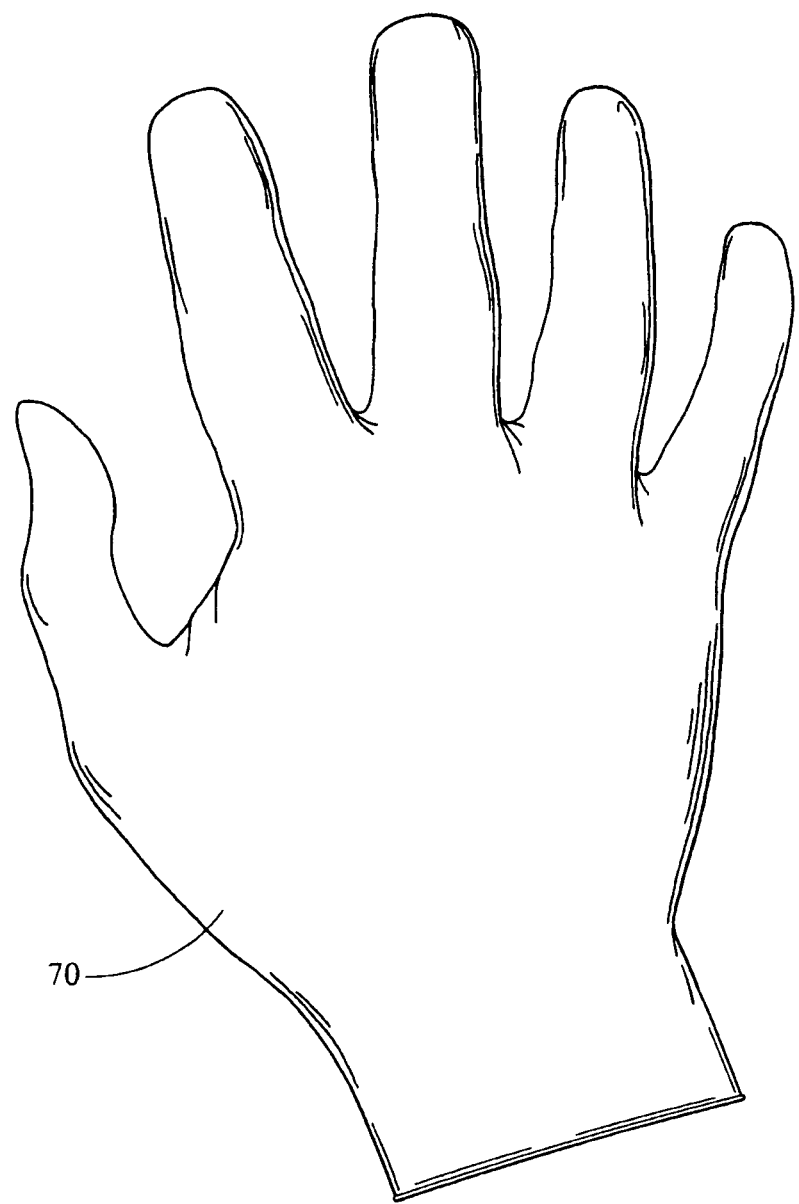
FIG. 7 illustrates a custom-fit glove made according to the embodiments described herein.

In the embodiments described above, the master mold may then be used to create a former 60 that is used to make custom-fit surgeons gloves. An example of a customized former 60 is shown in FIG. 6. The custom former may be dipped into a polymer bath to create a custom-fit disposable glove using either a batch or continuous dipping process. An example of a custom-fit glove 70 produced by the custom former described herein is shown in FIG. 7.

Each of the embodiments disclosed herein provides highly accurate data for making a mold. In some embodiments, this data may be transmitted to a disposable glove former manufacturing facility to create the custom former. The embodiments described herein save time and money by providing highly accurate information regarding the dimensions of a user's hand. This assists both the maker of the custom glove former and the glove manufacturer by saving and providing precise data regarding the dimensions of the user's hand. This is also beneficial for a glove user because the custom well-fit glove is personal to the user's hand size and reduces fatigue, cramping, soreness, etc.

According to alternative embodiment A, a method for making a surgical glove that custom fits a user's hand comprises the acts of taking a three-dimensional image of the user's hand, wherein the three-dimensional image provides data on the dimensions of the user's hand. The method further includes using the data to make a mold of the user's hand based on the data from the three-dimensional image and using the mold of the user's hand to prepare a former for use in making the custom-fit surgical glove.

According to alternative embodiment B, the method of alternative embodiment A, wherein the act of taking a three-dimensional image includes using one or more cameras.

According to alternative embodiment C, the method of alternative embodiment A, wherein the act of taking a three-dimensional image includes using a laser or scanner.

According to alternative embodiment D, the method of alternative embodiment A, wherein the act of using the data to make a mold of the user's hand includes using a computer software program to translate the data into hand dimensions for making the mold.

According to alternative embodiment E, a custom surgical glove former for making custom-fit surgical gloves according to the method of alternative embodiment A.

According to alternative embodiment F, a custom-fit surgical glove produced by the method of alternative embodiment A.

According to alternative embodiment G, a method for making a surgical glove that is customized for a user's hand comprises the acts of inserting the user's hand into an impression material, allowing the impression material to harden around the user's hand, removing the user's hand from the impression material after the impression material has hardened, using the hardened impression material to make a mold of the user's hand, and using the mold of the user's hand to prepare a former for use in making the customized surgical glove.

According to alternative embodiment H, the method of alternative embodiment G, further comprising the act of using a software computer program to translate data provided by the hardened impression material.

According to alternative embodiment I, a custom surgical glove former for making customized surgical gloves according to the method of alternative embodiment G.

According to alternative embodiment J, a customized surgical glove produced by the method of alternative embodiment G.

According to alternative embodiment K, a method for making a surgical glove that custom fits a user's hand comprises the acts of inserting a first portion of the user's hand into an impression material, allowing the impression material to harden around the first portion of the user's hand. While the first portion of the user's hand is in the impression material, taking a three-dimensional image of a second portion of the user's hand, the three-dimensional image providing data on the dimensions of the second portion of the user's hand. The method further comprises removing the first portion of the user's hand from the impression material after the impression material has hardened, scanning the imprint of the first portion of the user's hand in the impression material, using a combination of the scanned imprint of the first portion of the user's hand and the data from the three-dimensional image of the second portion of the user's hand to make a mold of the user's hand and using the mold of the user's hand to prepare a former for use in making the custom-fit surgical glove.

According to alternative embodiment L, the method of alternative embodiment K, wherein the act of taking a three-dimensional image includes using one or more cameras.

According to alternative embodiment M, the method of alternative embodiment K, wherein the act of taking a three-dimensional image includes using a laser or scanner.

According to alternative embodiment N, the method of alternative embodiment K, wherein the act of using a combination of the scanned imprint and the three-dimensional image to make a mold of the user's hand includes using a computer software program to translate the data into hand dimensions for making the mold.

According to alternative embodiment O, a custom surgical glove former for making custom-fit surgical gloves according to the method of alternative embodiment K.

According to alternative embodiment P, a custom-fit surgical glove produced by the method of alternative embodiment K.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the invention, which is set forth in the following alternative embodiments.

What is claimed is:

1. A method for making a surgical glove that custom fits a user's hand, the method comprising the acts of:
   taking a three-dimensional image of the user's hand, the three-dimensional image providing data on the dimensions of the user's hand;

using the data to make a positive mold of the user's hand based on the data from the three-dimensional image, the data from the three-dimensional image being specific to the user's hand;

using the positive mold of the user's hand to prepare a former for use in making the custom-fit surgical glove; and dipping the former into a polymer bath to create the custom-fit surgical glove, the custom-fit surgical glove precisely fitting the user's hand based on the hand-specific data.

2. The method of claim 1, wherein the act of taking a three-dimensional image includes using one or more cameras.

3. The method of claim 1, wherein the act of taking a three-dimensional image includes using a laser or scanner.

4. The method of claim 1, wherein the act of using the data to make a mold of the user's hand includes using a computer software program to translate the data into hand dimensions for making the mold.

5. The method of claim 1, further comprising removing the custom-fit surgical glove from the former for donning on the user's hand.

6. A method for making a surgical glove that is customized for a user's hand, the method comprising the acts of:

inserting the user's hand into an impression material;

allowing the impression material to harden around the user's hand;

removing the user's hand from the impression material after the impression material has hardened;

using the hardened impression material to make a positive mold of the user's hand, the mold having the user's hand-specific dimensions;

using the positive mold of the user's hand to prepare a former for use in making the customized surgical glove;

dipping the former into a polymer bath to make the customized surgical glove, and preparing the custom-fit surgical glove for precisely fitting the user's hand based on the hand-specific dimensions.

7. The method of claim 6, further comprising the act of using a software computer program to translate data provided by the hardened impression material.

8. A method for making a surgical glove that custom fits a user's hand, the method comprising the acts of:

inserting a first portion of the user's hand into an impression material;

allowing the impression material to harden around the first portion of the user's hand;

while the first portion of the user's hand is in the impression material, taking a three-dimensional image of a second portion of the user's hand, the three-dimensional image providing data on the dimensions of the second portion of the user's hand;

removing the first portion of the user's hand from the impression material after the impression material has hardened;

scanning the imprint of the first portion of the user's hand in the impression material;

using a combination of the scanned imprint of the first portion of the user's hand and the data from the three-dimensional image of the second portion of the user's hand to make a positive mold of the user's hand, the information from the scanned imprint and the three-dimensional image being specific to the user's hand in order to provide a precise fit;

using the mold of the user's hand to prepare a former for use in making the custom-fit surgical glove;

dipping the former into a polymer bath to make the custom-fit surgical glove; and preparing the custom-fit surgical glove to fit the specific dimensions of the user's hand once the custom-fit surgical glove is placed on the user's hand.

9. The method of claim 8, wherein the act of taking a three-dimensional image includes using one or more cameras.

10. The method of claim 8, wherein the act of taking a three-dimensional image includes using a laser or scanner.

11. The method of claim 8, wherein the act of using a combination of the scanned imprint and the three-dimensional image to make a mold of the user's hand includes using a computer software program to translate the data into hand dimensions for making the mold.

* * * * *

UNITED STATES PATENT AND TRADEMARK OFFICE
CERTIFICATE OF CORRECTION

| | | |
|---|---|---|
| PATENT NO. | : 8,512,615 B1 | Page 1 of 1 |
| APPLICATION NO. | : 12/080521 | |
| DATED | : August 20, 2013 | |
| INVENTOR(S) | : Samuel T. H. Amdur et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1151 days.

Signed and Sealed this
Tenth Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,512,615 B1 | Page 1 of 1 |
| APPLICATION NO. | : 12/080521 | |
| DATED | : August 20, 2013 | |
| INVENTOR(S) | : Samuel T. H. Amdur, Edward Danavi and Alan E. Weiss | |

It is certified that error appears in the above-identified patent and that said Letters Patent is hereby corrected as shown below:

On the Title Page, Item (73), Assignee, please delete "Medine" and insert -- Medline --, therefor.

Signed and Sealed this
Sixteenth Day of June, 2015

Michelle K. Lee
*Director of the United States Patent and Trademark Office*